US008583395B2

(12) United States Patent
Dybsetter et al.

(10) Patent No.: US 8,583,395 B2
(45) Date of Patent: Nov. 12, 2013

(54) SELF-TESTING OPTICAL TRANSCEIVER

(75) Inventors: Gerald L. Dybsetter, Scotts Valley, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 663 days.

(21) Appl. No.: 11/781,407

(22) Filed: Jul. 23, 2007

(65) Prior Publication Data
US 2009/0028574 A1 Jan. 29, 2009

(51) Int. Cl.
*G06F 19/00* (2011.01)
*H04B 10/00* (2013.01)

(52) U.S. Cl.
USPC .......................................... 702/119; 398/135

(58) Field of Classification Search
USPC ................................. 702/116, 119
See application file for complete search history.

(56) References Cited

U.S. PATENT DOCUMENTS

| | | | |
|---|---|---|---|
| 4,784,454 A | 11/1988 | Dyott | |
| 5,019,769 A | 5/1991 | Levinson | |
| 5,035,481 A | 7/1991 | Mollenauer | |
| 5,144,632 A | 9/1992 | Thonn | |
| 5,812,572 A | 9/1998 | King et al. | |
| 5,978,113 A | 11/1999 | Kight | |
| 6,400,737 B1 | 6/2002 | Broutin et al. | |
| 6,512,617 B1 | 1/2003 | Tanji et al. | |
| 6,590,644 B1 | 7/2003 | Coin et al. | |
| 6,618,425 B1 | 9/2003 | Carlesi et al. | |
| 6,898,702 B1 | 5/2005 | Evans | |
| 6,978,624 B2 | 12/2005 | Carlson et al. | |
| 7,215,891 B1 | 5/2007 | Chiang et al. | |
| 7,245,835 B1 | 7/2007 | Giaretta et al. | |
| 7,493,048 B2 | 2/2009 | Dybsetter et al. | |
| 7,509,050 B2 | 3/2009 | Ekkizogloy et al. | |
| 7,720,387 B2 | 5/2010 | Hahin et al. | |
| 2002/0027688 A1 | 3/2002 | Stephenson | |
| 2002/0078403 A1 | 6/2002 | Gullo et al. | |
| 2002/0097468 A1 | 7/2002 | Mecherle et al. | |
| 2002/0143920 A1 | 10/2002 | Dev et al. | |
| 2003/0223756 A1 | 12/2003 | Tatum et al. | |
| 2004/0022537 A1 | 2/2004 | Mecherle et al. | |
| 2004/0022543 A1 | 2/2004 | Hosking et al. | |
| 2004/0033079 A1 | 2/2004 | Sheth et al. | |
| 2004/0057730 A1 | 3/2004 | Littlejohn et al. | |
| 2004/0136719 A1 | 7/2004 | Hidai et al. | |

(Continued)

OTHER PUBLICATIONS

U.S. Appl. No. 11/260,448, filed Aug. 5, 2009, Office Action.

(Continued)

*Primary Examiner* — Bryan Bui
(74) *Attorney, Agent, or Firm* — Maschoff Brennan

(57) ABSTRACT

Systems and methods for an optical transceiver module to perform one or more diagnostic self-tests without the assistance of a host computing system. The optical transceiver module includes at least one processor, a persistent memory and a system memory. The persistent memory, which is coupled to the at least one processor, contains microcode. The microcode is loaded from the persistent memory to the system memory and executed by the at least one processor. The executed microcode causes the optical transceiver module to perform one or more diagnostic self-tests. The diagnostic result data of the one or more diagnostic self-tests is then stored in the persistent memory and is formatted for analysis. The formatted data may then be analyzed to ascertain the response of the optical transceiver to changes in its test environment.

19 Claims, 6 Drawing Sheets

(56) References Cited

U.S. PATENT DOCUMENTS

| | | |
|---|---|---|
| 2004/0165888 A1 | 8/2004 | Gerstel et al. |
| 2005/0017751 A1 | 1/2005 | Gunn et al. |
| 2005/0105915 A1 | 5/2005 | Light |
| 2005/0111845 A1 | 5/2005 | Nelson et al. |
| 2006/0002707 A1* | 1/2006 | Ekkizogloy et al. .......... 398/135 |
| 2006/0002708 A1 | 1/2006 | Hahin et al. |
| 2006/0002709 A1 | 1/2006 | Dybsetter et al. |
| 2006/0020715 A1* | 1/2006 | Jungck .......................... 709/246 |
| 2006/0034612 A1 | 2/2006 | Yu et al. |
| 2006/0051099 A1* | 3/2006 | Ekkisogloy et al. .......... 398/135 |
| 2006/0093372 A1* | 5/2006 | Hahin et al. .................. 398/135 |
| 2006/0098699 A1 | 5/2006 | Sanchez |
| 2006/0147217 A1* | 7/2006 | Hahin et al. .................. 398/135 |
| 2007/0253454 A1* | 11/2007 | Gustavson et al. ........ 372/38.07 |
| 2009/0028574 A1 | 1/2009 | Dybsetter et al. |

OTHER PUBLICATIONS

U.S. Appl. No. 11/260,448, filed Oct. 27, 2005, Jayne C. Hahin.
U.S. Appl. No. 11/828,976, filed Jul. 26, 2007, Suohai Mei.
U.S. Appl. No. 11/260,448, Feb. 5, 2010, Terminal Disclaimer.
U.S. Appl. No. 11/828,976, Dec. 31, 2009, Office Action.
U.S. Appl. No. 11/260,448, May 14, 2010, Notice of Allowance.
U.S. Appl. No. 11/260,448, Aug. 12, 2010, Notice of Allowance.
U.S. Appl. No. 11/828,976, Jul. 8, 2010, Non Final Office Action.
U.S. Appl. No. 10/883,208, Mar. 8, 2007, Non Final Office Action.
U.S. Appl. No. 10/883,208, Oct. 30, 2007, Final Office Action.
U.S. Appl. No. 10/883,208, Apr. 16, 2008, Non Final Office Action.
U.S. Appl. No. 10/883,208, Dec. 5, 2008, Final Office Action.
U.S. Appl. No. 10/883,208, Jul. 21, 2009, Final Office Action.
U.S. Appl. No. 10/883,208, Jan. 7, 2010, Notice of Allowance.
U.S. Appl. No. 10/883,208, Issued May 18, 2010, Issue Notification.

* cited by examiner

SELF-TESTING OPTICAL TRANSCEIVER

CROSS-REFERENCE TO RELATED APPLICATIONS

Not applicable.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an "optoelectronic transducer"), such as a laser or Light Emitting Diode ("LED"). The optoelectronic transducer emits light when current is passed through it, the intensity of the emitted light being a function of the magnitude of the current. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to as the "controller") controls the operation of the laser driver and post-amplifier.

BRIEF SUMMARY

The embodiments disclosed herein relate to systems and methods for an optical transceiver module to perform one or more diagnostic self-tests without the assistance of a host computing system. The optical transceiver module includes at least one processor, a persistent memory and a system memory.

The persistent memory, which is coupled to the at least one processor, contains microcode. The microcode is loaded from the persistent memory to the system memory and executed by the at least one processor. The executed microcode causes the optical transceiver module to perform one or more diagnostic self-tests. The diagnostic result data of the one or more diagnostic self-tests is then stored in the persistent memory and is formatted for analysis. The formatted data may then be analyzed to ascertain the response of the optical transceiver to changes in its test environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The embodiments disclosed herein relate to systems and methods for an optical transceiver module to perform one or more diagnostic self-tests without the assistance of a host computing system. The optical transceiver module includes at least one processor, a persistent memory and a system memory.

The persistent memory, which is coupled to the at least one processor, contains microcode. The microcode is loaded from the persistent memory to the system memory and executed by the at least one processor. The executed microcode causes the optical transceiver module to perform one or more diagnostic self-tests. The diagnostic result data of the one or more diagnostic self-tests is then stored in the persistent memory and is formatted for analysis. The formatted data may then be analyzed to ascertain the response of the optical transceiver to changes in its test environment.

Figure 1:
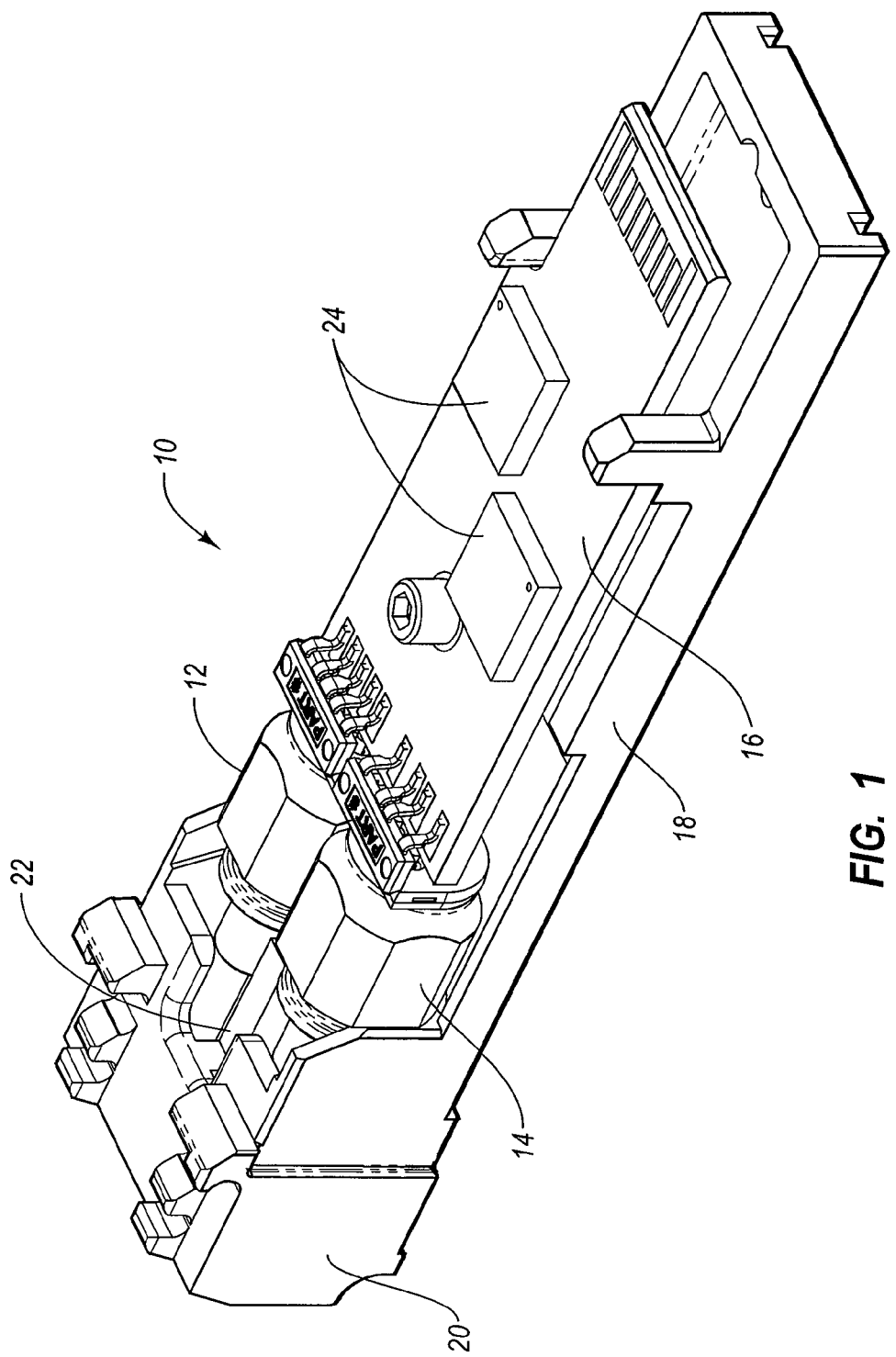
FIG. 1 is a perspective view of one embodiment of an optical transceiver according to one embodiment of the present invention.

The present invention can be implemented in various optoelectronic devices. As used herein, the term "optoelectronic device" includes devices having both optical and electrical components. Examples of optoelectronic devices include, but are not limited to optical transceiver modules ("optical transceivers"), transmitters, and/or receivers. FIG. 1 illustrates an exemplary optical transceiver 10 in which the principles of the present invention may be employed. The principles of the present invention allow for the optical transceiver 10 to perform end of life calculations autonomously and in real time. While the optical transceiver 10 will be described in some detail, the optical transceiver 10 is described by way of illustration only, and not by way of restricting the scope of the invention.

As depicted in FIG. 1, an exemplary transceiver module 10 includes a transmitter optical subassembly ("TOSA") 12, a receiver optical subassembly ("ROSA") 14, a printed circuit board (PCB) 16 and a housing 18 for containing the components of module 10. TOSA 12 and ROSA 14 are configured to be electrically and/or mechanically connected to PCB 16. In one embodiment, TOSA 12 and ROSA 14 are connected to PCB 16 using a lead frame connector disclosed in U.S. patent Ser. No. 10/809,992, filed Mar. 26, 2004, and incorporated herein by reference. Of course other structures may be used to connect TOSA 12 and ROSA 14 to PCB 16 such as, but not limited to, flexible circuits, through-hole connections, and surface-mount connections. The transceiver 10 also includes a housing end 20, and LC cable receptacles 22 for receiving and securely connecting LC cables to TOSA 12 and ROSA 14.

The optoelectronic devices can be constructed, for example, to be compatible with the XFP MSA standards, including those set forth in the 10 Gigabit Small Form Factor Pluggable Module adoption draft specification Revision 2.0 published by the XFP Multi Source Agreement (MSA) Group on Dec. 16, 2002 (www.xfpmsa.org), which is incorporated herein by reference, and with future revisions or final XFP MSA specifications that will be adopted in the future. Furthermore, the principles of the present invention may be implemented in optoelectronic devices of any form factor such as XFP, SFP and SFF, without restriction. It will be appreciated, however, that the optoelectronic devices need not comply with standardized form factor requirements and may have any size or configuration necessary according to a particular design. The principles of the present invention are suitable for 1 G, 2 G, 4 G, 8 G, 10 G and higher bandwidth fiber channels.

TOSA 12 includes a light source (not shown) having any suitable configuration including, but not be limited to, a distributed feedback ("DFB") laser, a VCSEL, a cooled or uncooled EML, an EML with a wavelocker, a Fabry-Perot laser, a laser emitting diode ("LED"), and the like. ROSA 14 may comprise, for example, a photodiode, an avalanche photodiode (APD), positive-intrinsic-negative photo diodes (PIN), and the like. In one embodiment, module 10 may include a temperature-compensated externally modulated laser (EML) for use in dense wavelength division multiplexing applications (DWDM) and therefore be more completely described as a DWDM EML XFP transceiver module.

As illustrated in FIG. 1, PCB 16 includes circuitry and electronic components 24 for use with the TOSA 12 and ROSA 14 in performing the optical signal transmission and reception activities of the transceiver 10. Among the components 24 are a laser driver, a post amplifier, a controller chip, and persistent memory. These components are described more fully below. It will be appreciated that one or more of these components can be integrated on a single chip, or can be separately disposed on the PCB 16. In one exemplary embodiment, the transceiver 10 uses the controller chip to drive end of life calculations of the laser of the transceiver internally within the module. In particular, the controller chip cooperates in one embodiment with the laser driver, post amplifier, and other components within the transceiver 10 to obtain diagnostic data and to perform an end of life calculation of the laser, which can then be exported from the module, such as to a host system.

Figure 2:
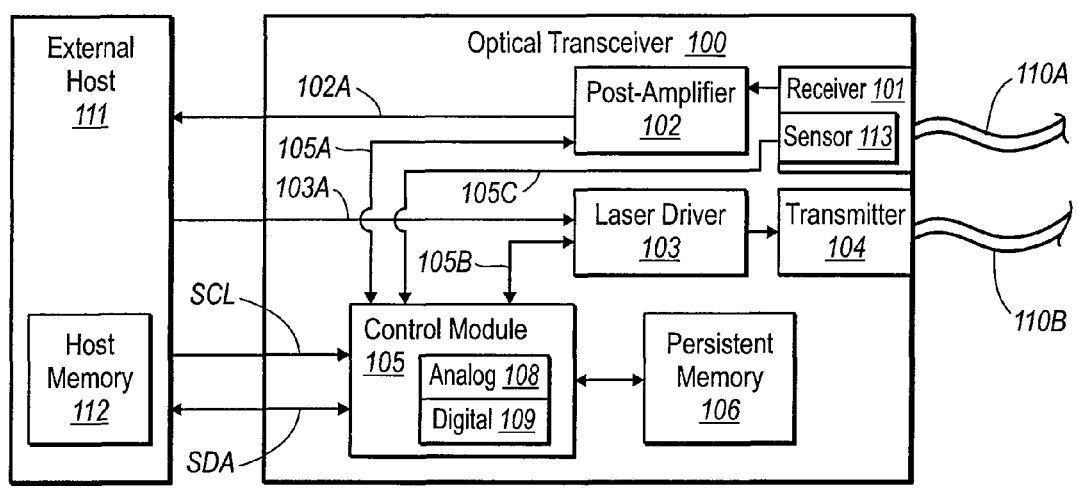
FIG. 2 schematically illustrates an exemplary optical transceiver that may implement features of the present invention.

With reference now to FIG. 2, the circuitry of an exemplary optoelectronic device, implemented here as a transceiver 100 is further illustrated, showing the interaction between the device 100, a host system such as an external host 111, and fiber optic cables 110A, 110B. Note that the transceiver 100 shown in FIG. 2 is a simplified block diagram of a transceiver such as that shown at 10 in FIG. 1.

In operation, the optical transceiver 100 receives an optical signal from fiber 110A using an optical receiver 101, which corresponds to the ROSA 14 of FIG. 1. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to the host 111 as represented by arrow 102A. The host 111 may be any computing system capable of communicating with the optical transceiver 100. The host 111 may contain a host memory 112 that may be a volatile or non-volatile memory source. In one embodiment, the optical transceiver 100 may be integrated with the host 111 in the form of a printed circuit board or other components/chips within the host 111, although this is not required. Additionally, some components of the optical transceiver 100 can reside on the host 111 while the other components of the transceiver reside on a printed circuit board separate from the host.

The optical transceiver 100 may also receive electrical signals from the host 111 for transmission onto the fiber 110B. Specifically, the laser driver 103 receives the electrical signal as represented by the arrow 103A, and drives an optical transmitter 104, which corresponds to the TOSA 12 of FIG. 1. As described, the transmitter 104 includes a suitable light source, such as a laser or light emitting diode ("LED") that is driven by the electrical signals provided by the host 111, thereby causing the light source to emit onto the fiber 110B optical signals representative of the information carried in the electrical signal. Accordingly, the optical transmitter 104 serves as an electro-optic transducer.

The behavior of the optical receiver 101, the post-amplifier 102, the laser driver 103, and the optical transmitter 104 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, and/or operating conditions, such as voltage, and receive information from the post-amplifier 102 (as represented by arrow 105A) and from the laser driver 103 (as represented by arrow 105B). This allows the control module 105 to optimize the dynamically varying performance, and additionally detect when there is a loss of signal. Specifically, the control module 105 may optimize the operation of the transceiver 100 by adjusting settings on the post-amplifier 102 and/or the laser driver 103 as represented by the arrows 105A and 105B. These settings adjustments can be intermittent and are generally only made when temperature or voltage or other low frequency changes so warrant. As discussed, the control module 105, the post-amplifier 102, and the laser driver 103 may be the same chip. Alternatively, they may be distributed across two or more chips.

The control module 105 may have access to a persistent memory 106, which in one embodiment, is an Electrically Erasable and Programmable Read Only Memory (EEPROM). Persistent memory 106 may also be any other non-volatile memory source. The persistent memory 106 and the control module 105 may be packaged together in the same package or in different packages without restriction.

Data and clock signals may be provided from the host 111 to the control module 105 using the serial clock line SCL, and the serial data line SDA. Also data may be provided from the control module 105 to the host 111 using serial data signal SDA to allow for transmitting diagnostic data such as environmental and/or operational parameters. The control module 105 includes both an analog portion 108 and a digital portion 109. Together, they allow the control module to implement logic digitally, while still largely interfacing with the rest of the optical transceiver 100 using analog signals.

The control module 105 senses and retrieves diagnostic data relating to the operation of the transceiver 100. As used herein, the term "diagnostic data" will refer to both environmental parameters and operational parameters, whether the parameter is provided as raw data or processed data. Diagnostic data can be provided in analog or digital form. The environmental parameters may be, for example, ambient transceiver temperature, supply voltage, humidity, acceleration, ambient light levels, ambient vibration, magnetic flux intensity, or any other environmental parameter that may affect the performance of an optoelectronic device and/or that may be compensated for by suitable adjustment of one or more operational parameters. Generally, environmental parameters are not directly controlled by the transceiver but nonetheless affect its operation.

Operational parameters can include statistical information such as, for example, total operational time, average operational time between boots, total number of error conditions encountered, identification of one or more error conditions encountered, categorization of the number of error conditions encountered for a plurality of different error types, number of times the optical transceiver has been booted, or the like. Operational parameters also include, for example, laser wavelength, laser temperature, laser bias current, a Thermo Electric Cooler (TEC) current, transmit power, receive power, acceleration, peak acceleration, and the like. Generally, operational parameters are considered those parameters over which direct control can be had by the transceiver or host.

Figure 3:
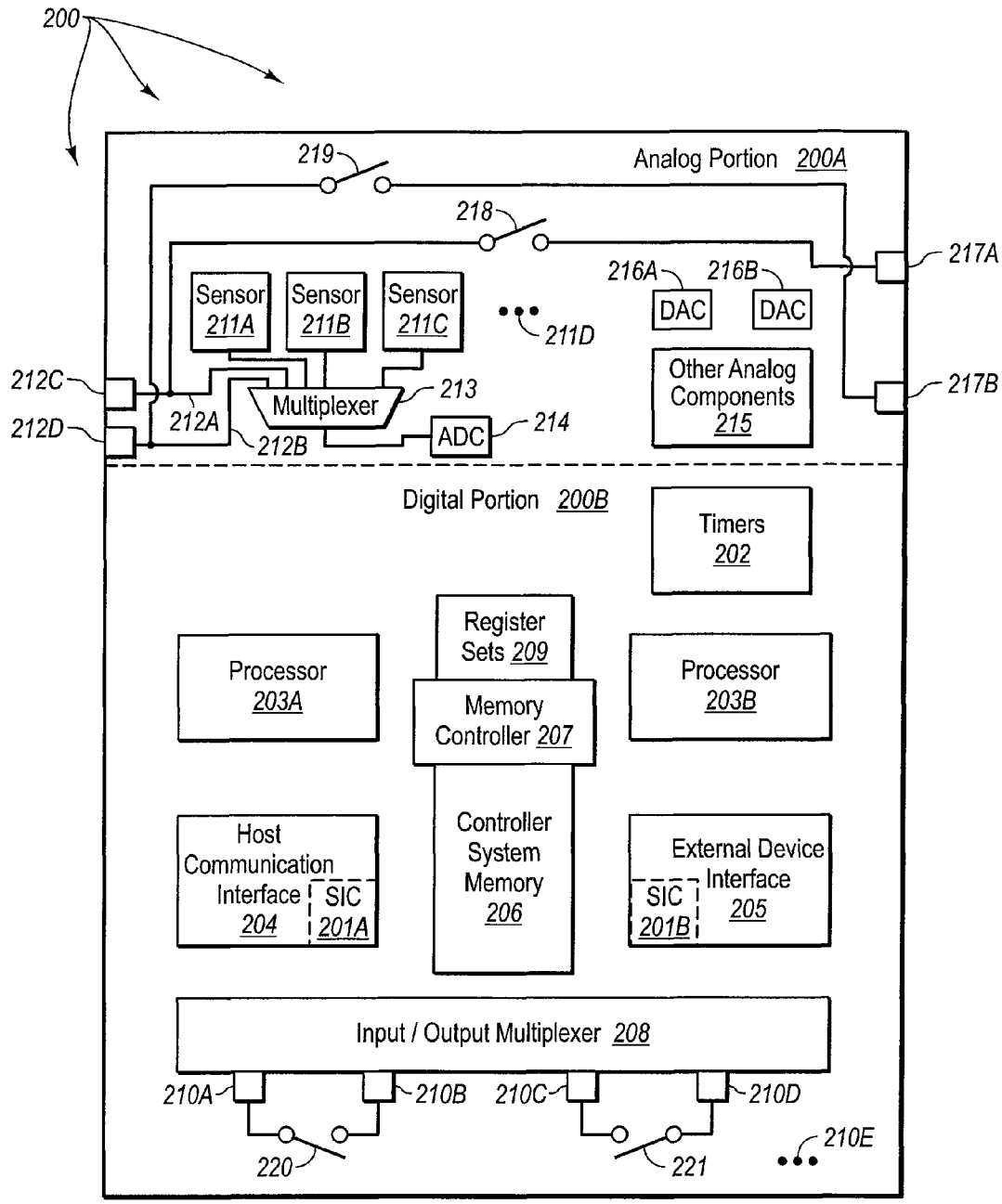
FIG. 3 schematically illustrates an example of a control module used in the transceiver of FIG. 2.

FIG. 3 schematically illustrates an exemplary configuration 200 of the control module 105 in further detail. The control module 200 includes an analog portion 200A that represents an example of the analog portion 108 of FIG. 2, and a digital portion 200B that represents an example of the digital portion 109 of FIG. 2. For example, the analog portion 200A may contain digital to analog converters, and analog to digital converters, high speed comparators (e.g., for event detection), voltage based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring diagnostic data including environmental and/or operational parameters that may be measured from the control module 200 such as, for example, supply voltage and transceiver temperature. The control module may also receive external analog or digital signals from other components within the optical transceiver. Two external lines 212A and 212B are illustrated for receiving such external analog signals although there may be many of such lines.

The internal sensors 211A through 211D may generate analog signals that represent the measured values. In addition, the externally provided signals 212A, 212B may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow for any order of analog signals to be sampled by ADC 214.

As previously mentioned, the analog portion 200A can include high speed comparators that may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator.

The digital portion 200B of the control module 200 may include a timer module 202 that provides various timing signals used by the digital portion 200B. Such timing signals may include, for example, programmable processor times. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 using the serial data (SDA) and serial clock (line SCL) lines and the serial data line SDA of the optical transceiver 100. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. While system memory 206 may be RAM, it may also be a processor, register, flip-flop or other memory device. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or may be another serial interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

It is often the case that is desirable for a manufacturer of optical transceiver 100 to perform various manufacturing tests on optical transceiver 100 at manufacture time. Such tests verify that optical transceiver 100 functions properly. For example, manufacturing tests may be performed on various operational parameters such as transmit and receive power. In addition, various components of optical transceiver 100 such as post-amplifier 102, laser driver 103, or control module 105 may also be tested to ensure proper function.

As part of the manufacturing testing, it may be desirable to perform the various manufacturing tests under changing environmental conditions. For example, it may be desirable to ascertain how optical transceiver 100 performs while the temperature is raised or lowered or if the surrounding air pressure is varied. As will be appreciated after reading this description, there are numerous environmental conditions that may be varied during a manufacturing test.

Figure 4:
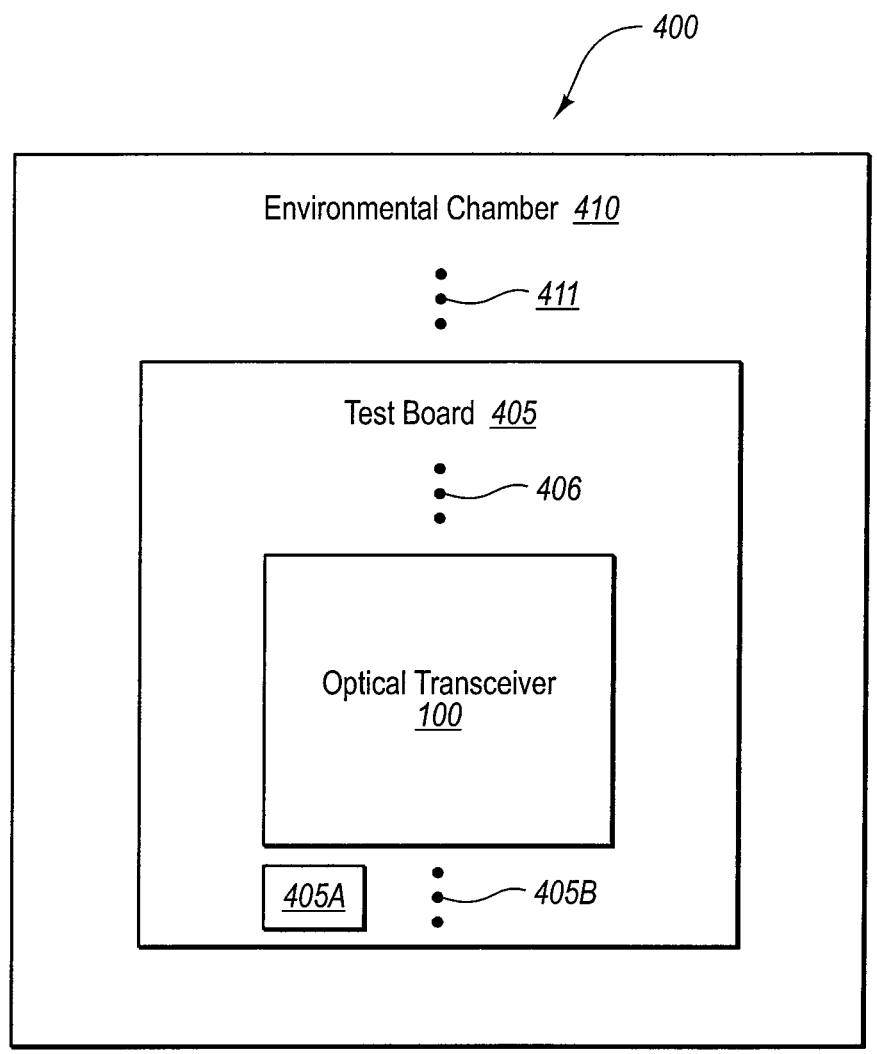
FIG. 4 illustrates a test environment used for measuring changes in the test environment.

One embodiment of performing manufacturing tests under changing environmental conditions is illustrated in FIG. 4, which shows a test environment 400. Included in test environment 400 are test board 405 and environmental chamber 410. During a test, a user typically connects optical transceiver 100 to test board 405. Note that ellipses 406 represent that any number of additional optical transceivers 100 may be connected to test board 405. Test board 405 includes a connection 405A that represents one or more connections that are used to provide voltage, current and the like to optical transceiver 100 while a manufacturing test is being performed. Ellipses 405B represent that there may be any number of connections 405 as needed. Connections 405 may also be used to provide simulated transmit or receive signals to optical transceiver 100 to test the transmit and receive functions of optical transceiver 100.

The test board 405 including optical transceiver 100 may then be placed into environmental chamber 410. In one embodiment, environmental chamber 410 may be, but is not limited to, an oven or a pressure chamber. Ellipses 411 represent that any number of additional test boards 405 may also be placed in environmental chamber 410 as needed. The manufacturing tests may then be performed while changing the environmental conditions. For example, the temperature may be raised or lowered or the pressure may be changed.

Although test environment 400 allows for manufacturing tests to be performed in changing environmental conditions, it is often difficult to test the response of the various operational parameters of operational transceiver 100 to the changing environmental conditions. It also difficult to test the response of the analog and digital components of optical transceiver 100.

Advantageously, in accordance with the present invention, the optical transceiver 100 is configured to perform one or more diagnostic self-tests without the active assistance of host 111. In this description and in the claims "without the assistance of the host" is defined to mean that transceiver 100 may perform the diagnostic self-tests without needing to be coupled to a host computing device. In other words, optical transceiver 100 is capable of initiating the diagnostic self-tests by itself and includes the hardware and/or software necessary to perform the tests. The diagnostic self-tests may be accomplished in a number of ways using the environments described and illustrated with respect to FIGS. 2, 3 and 4. It will be understood that these environments are only a few of the countless architectures in which the principles of the present invention may be employed. As previously stated, the principles of the present invention are not intended to be limited to any particular environment.

Figure 5:
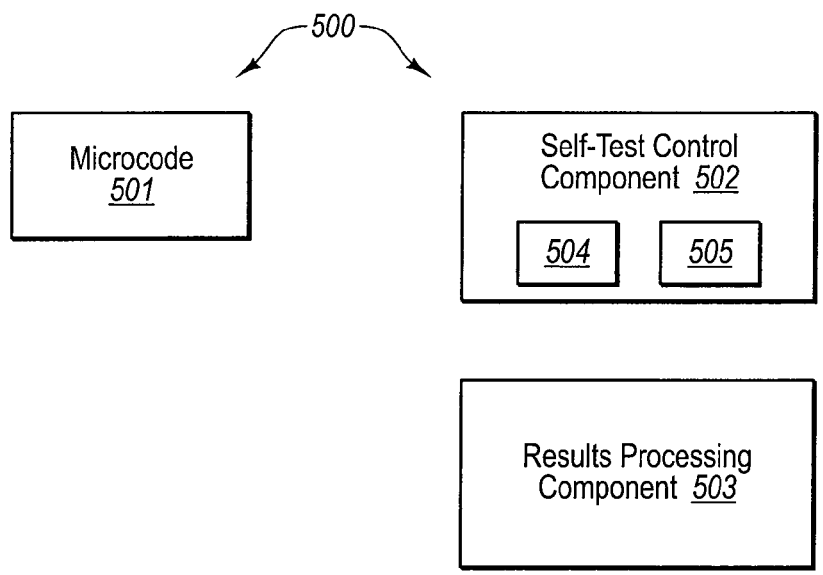
FIG. 5 illustrates an exemplary software architecture that may be maintained in system memory in accordance with the principles of the present invention.

Reference is now made to FIG. 5, which illustrates a software architecture 500 that may be instantiated in system memory 206. In particular, the processors 203 load microcode 501 into the system memory 206 from the persistent memory 106. In the description and in the claims, "microcode" is defined to mean any type of operational or control code, such as, but not limited to, firmware and software, that runs on a microprocessor and controls the operation of the transceiver when executed. The remainder of the software architecture 500 is either instantiated in system memory 206 upon the execution of the microcode 501, or else abstractly represents functionality implemented by the optical transceiver 100 upon the execution of the microcode 501. Alternatively, the microcode 501 may be directly executed from persistent memory. In that case, the microcode 501 is loaded into the system memory a fraction at a time (e.g., one instruction at a time) for execution by the processor. In this latter case, the system memory may be a register, flip-flops, or any other memory regardless of size or type.

The software architecture 500 includes a diagnostic self-test control component 502 and a results processing component 503. In some embodiments, diagnostic self-test control component 502 may include an environmental parameter component 504 and an operation parameter component 505. The software architecture 500 of FIG. 5 will be described with reference to FIG. 6, which illustrates a flowchart of an exemplary method 600 for the optical transceiver to perform one or more diagnostic self-tests on an optical transceiver.

First, the optical transceiver 100 loads the microcode 501 from persistent memory 106 to system memory 206 (act 601). One or more of the processors 203 then execute the microcode (act 602). The microcode 501 is structured such that the optical transceiver 100 performs the acts illustrated at act 602 when executed. Specifically, the processors 203 cause the optical transceiver 100 to perform one or more diagnostic self-tests on one or more analog or digital components of the optical transceiver 100 (act 603), the diagnostic result data of the one or more diagnostic self-tests is stored in the persistent memory (act 604), and the diagnostic results are formatted for later analysis (act 605). In some embodiments, one or more environmental or operational parameters may be sensed and evaluated by optical transceiver 100 as part of the act 603. In other embodiments, specific analog and/or digital modules or components of optical transceiver 100 may be tested as part of act 603. In still other embodiments, the formatted diagnostic result data may be stored to ascertain the response of the optical transceiver 100 to its test environment.

In further detail, at act 601, the microcode for performing one or more diagnostic self-tests is loaded. Exemplarily, one or more of the processors 203 load microcode stored in persistent memory 106 into controller system memory 206. If the persistent memory 106 is an I²C EEPROM, then this may be accomplished using the conventional I²C two-wire interface. However, for other persistent memories, other communication protocols may be used. The microcode from persistent memory 106 includes functions that direct the end of life calculation.

At act 602, one or more of the processors 203 execute the microcode loaded during act 401. In response to the execution, at act 603 one or more diagnostic self-tests may be performed by optical transceiver 100. For example, diagnostic self-test control component 502 may cause that a self-test be performed on various modules or components of optical transceiver 100. This may be accomplished by environmental parameter component 504 or operational parameter component 505. In addition, self-test control component 502 may cause that one or more environmental or operational parameters be tested. Specific examples of diagnostic self-tests that may be performed by optical transceiver 100 during act 603 will be described in more detail to follow.

At act 604, the results of the diagnostic self-tests are stored in persistent memory. For example, results processing component 503 may write the results of the one or more self-diagnostic tests in the persistent memory 106. At act 605, the results processing component 503 may format the stored diagnostic results data for analysis.

For example, in one embodiment the result of the various diagnostic self-tests may be formatted such that a measured particular operational parameter is mapped against one or more changes in environmental parameters. The same process could be implemented for the analog and digital components of optical transceiver 100. This would create a record of how well optical transceiver 100 operates when subjected to the one or more environmental changes. It would also create a record of what ranges of environmental conditions caused optical transceiver 100 to fail. For example, in the case of rising temperature a record would be created of what temperatures transceiver 100 operated correctly at and at what temperatures caused optical transceiver 100 to fail.

In other embodiments, the measured test results of the operational parameters or the components may be compared by processors 203 with expected values written in persistent memory 106 or included in the microcode 501 for a given environmental parameter. A status marker may then be written in persistent memory 106 that indicates if the measured results matched the expected results for the given change in the environmental parameter.

Alternatively, a status marker or some other indication may be written to the persistent memory that indicates a specific temperature or other environmental parameter that caused the operation of optical transceiver 100 to fail.

Once formatted, the diagnostic self-test data may then be analyzed. In some embodiments, optical transceiver 100 may be removed from test board 405 and coupled with host 111. Host 111 may then access the formatted data in persistent memory 106 and perform analysis on the data. In other embodiments, the saved formatted diagnostic data may be accessed by other reasonable means.

Specific examples of diagnostic self-tests that may be performed will now be described. As will be appreciated after reading this specification, the diagnostic self tests to be described are for example only and should not be used to limit the scope of the appended claims. For example, in one embodiment self-test control component 502 may implement environmental parameter component 504 and/or operational parameter component 505 in order to sense data of one or more operational and/or environmental parameter. In some embodiments, these components may use one or more of the sensors 211 to perform the operations.

For instance, a sensor 211 may be configured to measure one or more of ambient temperature, optical transceiver temperature, or laser temperature, or other environmental parameter such as pressure. Another of the sensors 211 may then be configured to measure various operational parameters of the optical transceivers. Such operational parameters may include, but are not limited to, laser bias current, laser power, laser wavelength, received optical power, and the like as mentioned previously. In this way, the operational parameters may be sensed or measured at various temperatures, pressures or other environmental parameter. In some embodiments, the operating time of optical transceiver 100 may also be measured.

The measured operational parameters at the various temperatures or other environmental parameters may then be compared to expected values or otherwise analyzed by the processors 203. In this way, the various operational parameters of optical transceiver module 100 may be ascertained during various changes to environmental parameters. As previously described, the results processing component 503 may then format the results for later analysis as needed.

In another embodiment, a self-test may be performed that measures the voltage or current level at a specific portion of the optical transceiver module. For example, a sensor 211 may be configured to measure the expected voltage level at the laser driver 103 or at the post-amplifier 102. This level may then be compared with expected values or otherwise analyzed. For instance, if the excepted voltage level at the specified portion was 3.3 volts and the measured value was 4.0 volts, then it could be ascertained that any failure of optical transceiver module 100 was due to an excess amount of voltage being applied.

In some embodiments, a simulated transmit or receive signal may be provided to optical transceiver 100 while undergoing the manufacturing test process. In such embodiments, the simulated signals could be provided to optical transceiver 100 through use of the test board 405 as previously described. The executed microcode in this embodiment may cause control module 200 to implement an analog loopback to self-test the electrical and/or optical interfaces of optical transceiver 100 during the changing environmental conditions of the manufacturing tests. More detail on analog loopback testing is described in commonly assigned, co-pending U.S. patent application Ser. No. 11/260,448 filed Oct. 27, 2005, which is incorporated by reference in its entirety.

Figure 7:
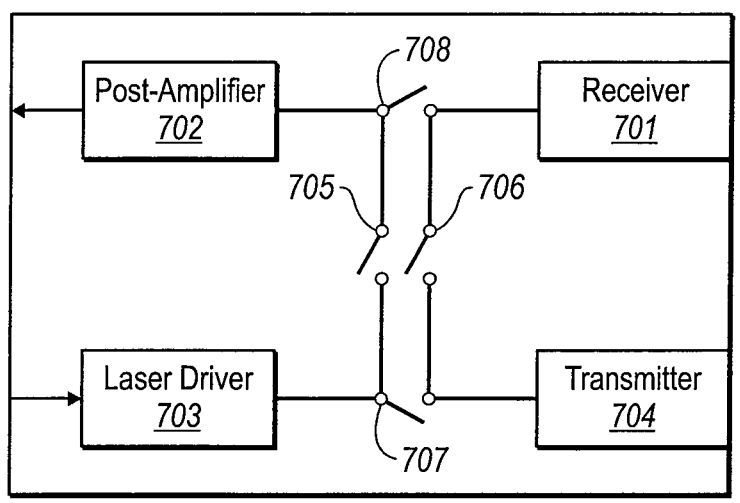
FIG. 7 schematically illustrates an example of an optical transceiver portion including a configurable switch array in accordance with an embodiment of the present invention.

FIG. 7 shows a configurable switch array dispersed amongst and between optical and electrical interfaces of optical transceiver 100. As will be appreciated by one skilled in the art, the specifically illustrated configurable switch is only one example of many possible configurable switch arrays that may be used to facilitate the principles of the present invention. In the specification and in the claims, the configurable switch array may be any switch array, whether now known or discovered in the future, that may be configured by microcode. For example, each individual switch in the configurable switch array may be as straightforward as being a single transistor. However, the switches may be more complex, involving potentially many circuit components. The depicted configurable switch array of FIG. 7 is illustrated and will be described as conceptually including switches 705 through 708.

Referring back to FIG. 2, transceiver control module 200, as described above, contains processors 203 and a bank of register sets 209. In some embodiments, it may be possible that one or more of the registers 209 may be memory mapped to combinational logic that control switches 705 through 708. The processors 203 may write microcode to these registers to control the operation of the switches. For example, a register from register sets 209 may be a one byte register that includes a single bit of digital data that controls whether a corresponding switch in the configurable switch array is open or closed. For example, if the switch in the configurable switch array receives a binary 1, then the switch may close. Conversely, if the switch receives a binary 0, then the switch may open.

The configurable switch array may be opened and/or closed as need to perform the loopback tests. For example, in order to test the response of the electrical interface to a simulated transmit signal, switches 707 and 708 could be opened and switch 705 closed to allow a signal to flow from laser driver 703 to post-amplifier 702.

In like manner, in order to test the response of the optical interface to a simulated receive signal, switches 707 and 708 could be opened and switch 706 closed to allow a signal to flow from receiver 701 to transmitter or laser 704. Additionally, switches 707 and 708 may be closed to test the normal transmit and receive properties of optical transceiver 100. As will be appreciated, other loopback tests may also be performed.

The response of the electrical interface and/or the optical interface may be monitored by control module 200 and written to persistent memory 106 by the processors 203. As previously described, the results processing component 503 may then format the results for later analysis as needed.

In still other embodiments, it may be desirable to perform one or more digital loopback tests to ascertain the response of the various digital interfaces during the manufacturing tests. The executed microcode in this embodiment may cause control module 200 to implement a digital loopback to self-test the digital interfaces of optical transceiver 100 during the changing environmental conditions of the manufacturing tests. More detail on digital loopback testing is described in commonly assigned, co-pending U.S. patent application Ser. No. 11/320,182 filed Dec. 28, 2005, which is incorporated by reference in its entirety.

Referring again to FIG. 2, a configurable switch array is shown dispersed amongst and between the input and output terminals of control module 200. The individual switches in the configurable switch array couple an output terminal to a corresponding input terminal when closed. The specifically illustrated configurable switch array is only one example of many possible switch arrays that may be used to facilitate the principles of the present invention. Each switch in the configurable switch array may be as straightforward as being a single transistor. However, the switches may be more complex involving potentially many circuit components. In the depicted embodiment of FIG. 2, the configurable switch array includes switches 218 through 221. There may also be numerous additional switches coupled to the additional input/output terminals 210E.

Transceiver control module 200, as described above, contains processors 203 and a bank of register sets 209. In some embodiments, it may be possible that one or more of the registers 209 may be memory mapped to combinational logic that control switches 218 through 221. The processors 203 may write digital values to these registers to control the operation of the switches. For example, a register from register sets 209 may be an 8 bit register that contains a bit of digital data that controls whether a corresponding switch in the configurable switch array is open or closed. For example, if the switch receives a binary 1, then the switch array may be closed. Conversely, if the switch receives a binary 0, then the switch may be open. Specific examples of self-tests using the internalized loopbacks will now be described for both the analog portion 200A and the digital portion 200B.

For example, suppose that the executed microcode directed control module 200 to self-test ADC 214. A binary 1 would be written to the registers in register sets 209 that were memory mapped to switches 218 and 219, causing the switches to close, thus connecting the output terminals 217A and 217B to the input terminals 212C and 212D.

The processors 203 would then cause digital to analog converter (DAC) 216A and DAC 216B to assert an analog signal on output terminals 217A and 217B respectively. The signals would flow back to and would be received by input terminals 212C and 212D as seen in FIG. 2. The analog signal would then be propagated along lines 212A and 212B through multiplexer 213 to ADC 214. If working properly, ADC 214 would convert the analog signals to digital signals and would provide them to either register sets 209 or controller memory 206. In this way, the processors 203 would be able to detect the response of ADC 214, and potentially thereby evaluate its performance.

In like manner, the microcode may direct that processors 203 to initiate a self-test of the response of control module 200 to signals coming from other components in transceiver 100. The processors would once again close switches 218 and 219 to couple the output terminals 217 to the input terminals 212 by writing a binary 1 to the memory mapped register. The processors would then cause DACs 216A and 216B to assert on output terminals 217A and 217B respectively signals that represent operational values from components in transceiver 100. For example, a signal representative of laser bias current could be asserted on output terminal 217A while a signal representative of supply voltage could be asserted on output terminal 217B.

The laser bias signal would flow back to and be received by input terminal 212C. The signal would flow on line 212A and be propagated through multiplexer 213 to ADC 214, where the analog signal would be converted to a digital signal and provided to controller system memory 206. Here the processors 203 may read the value and determine that the laser bias current needed to adjusted. If so, then a signal would be generated and provided to a DAC and an output terminal. The processors would detect this response.

Similarly, the supply voltage signal would flow back to and be received by input terminal 212D. This signal would also be provided to the controller system memory 206. Processors 203 would also in this case detect a response of the control module to the signal and potentially thereby evaluate performance of the control module.

The internalized loopbacks may also be used to self-test the other components and operations of the analog portion 200A. For example, signals could be asserted on the output terminals to test a high speed comparator, a digital-to-analog converter, or a temperature sensor. The switches 218 and 219 would be closed and the asserted signals would be received by the input terminals and cause a response as previously described.

The internalized loopbacks using the input/output pins of terminals 210A through 210D may be used to self-test the logical functional blocks of the digital portion 200B of control module 200. As in the analog portion 200A, the loopbacks utilize switches, in this case switches 220 and 221, which couple one input/output pin to another input/output pin. The switches may be memory mapped to a register in register sets 209 as described previously.

As mentioned earlier, the digital input/output pins 210 may be assigned dynamically by the digital components according to the operational circumstances of control module 200. For example, the host communication interface 204 may assign input/output pins 210A and 210B for its use. Later, under different operational circumstances, the external device interface 205 may assign input/output pins 210A and 210B for its use.

The executed microcode may direct that host communication interface 204 assign input/output pins 210A and 210B for its use. The processors would be directed by the microcode to close switch 220 by writing a binary 1 to the memory mapped register, thus coupling the output terminal to the input terminal. The processors would then direct host communication interface 204 to assert a signal on output pin 210A. Since the pins are coupled by the closed switch 220, input pin 210B would receive the signal, which could then be provided to host communication interface 204. In this way, the response of the host communication interface while it is sending a signal and receiving a signal may be detected by the processors 203.

In like manner, the microcode may direct that a self-test be performed on the external device interface 205. As with the host communication interface, the microcode may direct that the external device interface 205 assign input/output pins 210C and 210D for its use, although pins 210A and 210B would work equally as well. The processors would be directed by the microcode to close switch 221 by either writing a binary 1 to the memory mapped register, thus coupling the output terminal to the input terminal. The processors would then direct external device interface 205 to assert a signal on output pin 210C. Since the pins are coupled by the closed switch 221, input pin 210D would receive the signal, which could them be provided to external device interface 205. In this way, the response of the external device interface while it is sending a signal and receiving a signal may be detected by the processors 203. The internalized loopbacks may also be used to self-test the other components and functional logic blocks in digital portion 200B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver module that includes at least one processor, a persistent memory and a system memory, a method for the optical transceiver module to perform one or more diagnostic self-tests without the assistance of a host operating system, the method comprising the following:
    an act of loading microcode from the persistent memory to the system memory;
    an act of executing the microcode using the at least one processor, wherein the microcode is structured such that the optical transceiver module performs the following when executed by the at least one processor:
        an act of performing one or more diagnostic self-tests;
        an act of storing diagnostic result data of the one or more diagnostic self-tests in the persistent memory; and
        an act of formatting the stored diagnostic results for analysis, wherein the act of formatting the stored diagnostic results for analysis includes creating a status marker written to the persistent memory that indicates if the result data matches expected results for a given change in a specific environmental parameter and includes mapping a stored analog component against a stored digital component; and
    wherein the optical transceiver module is configured to be connected to a test board and placed in an environmental chamber during performance of the one or more diagnostic self-tests.

2. The method in accordance with claim 1, further comprising:
    an act of analyzing the formatted stored diagnostic result data to ascertain the response of the optical transceiver module to changes in its test environment.

3. The method in accordance with claim 1, the optical transceiver module further including at least one sensor, wherein the act of performing one or more diagnostic self-tests comprises:
    an act of sensing data of at least one operational or environmental parameter relating to the optical transceiver module.

4. The method in accordance with claim 3, wherein the operational or environmental parameter is one of operating time, laser bias current, laser power, laser wavelength, received power, module temperature, laser temperature, or voltage measured at a specific portion of the optical transceiver module.

5. The method in accordance with claim 1, the optical transceiver module further including a receive path comprising an opto-electric transducer configured to convert a received optical signal into a received electrical signal, and a post-amplifier configured to process the received electrical signal, a transmit path comprising an electro-optic transducer driver configured to generate an electrical transmit signal, and an electro-optic transducer configured to convert the electrical transmit signal into an optical transmit signal, and a configurable switch array, wherein the act of performing one or more diagnostic self-tests comprises:
    an act of controlling the configurable switch array to selectively connect and disconnect a node in the receive path between the opto-electric transducer and the post-amplifier with a node in the transmit path between the electro-optic transducer driver and the electro-optic transducer such that the optical transceiver module enters or leaves an analog loopback mode.

6. The method in accordance with claim 5, wherein the configurable switch array comprises:
    a first switch for connecting the electro-optic transducer driver to the post-amplifier;
    a second switch for connecting the opto-electric transducer to the electro-optic transducer;
    a third switch for connecting the electro-optic transducer driver to the electro-optic transducer; and
    a fourth switch for connecting the post-amplifier to the opto-electric transducer.

7. The method in accordance with claim 1, the optical transceiver module further including a microcontroller that includes the at least one processor and the system memory, the microcontroller further including a plurality of input terminals, a plurality of output terminals, and a configurable switch array, wherein the act of performing one or more diagnostic self-tests comprises:
    an act of closing the configurable switch array so as to couple one of the output terminals to one of the input terminals;
    an act of asserting a signal on the output terminal;

an act of receiving a corresponding signal on the input terminal; and an act of detecting a response of the microcontroller to the received signal on the input terminal.

8. The method in accordance with claim 1, wherein the act of formatting the stored diagnostic results for analysis includes mapping a first parameter against a second parameter.

9. The method in accordance with claim 1, wherein the act of formatting the stored diagnostic results for analysis includes mapping a measured operational parameter against one or more changes in environmental parameters.

10. The method in accordance with claim 1, wherein the act of formatting the stored diagnostic results for analysis includes creating a status marker that indicates if the stored diagnostic results match expected results.

11. An optical transceiver module comprising the following:

at least one processor;

a system memory;

a persistent memory, wherein the persistent memory contains microcode that when executed by the at least one processor, causes the optical transceiver module to perform the following:
   an act of performing one or more diagnostic self-tests;
   an act of storing diagnostic result data of the one or more diagnostic self-tests the in the persistent memory; and
   an act of formatting the stored diagnostic results for analysis, wherein the act of formatting the stored diagnostic results for analysis includes creating a record that indicates if the result data matches expected results for a given change in a specific environmental parameter; and one or more connections configured to connect the optical transceiver module to a test board for placement of the optical transceiver module with the test board in an environmental chamber during performance of the one or more diagnostic self-tests.

12. The optical transceiver module in accordance with claim 11, wherein the executed microcode further causes the optical transceiver module to perform the following:

an act of analyzing the formatted stored diagnostic result data to ascertain the response of the optical transceiver module to changes in its test environment.

13. The optical transceiver module in accordance with claim 11, the optical transceiver module further including a sensor for sensing an environmental or operational parameter, wherein the act of performing one or more diagnostic self-tests comprises:

an act of sensing data of at least one operational or environmental parameter relating to the optical transceiver module.

14. The optical transceiver module in accordance with claim 13, wherein the operational or environmental parameter is one of operating time, laser bias current, laser power, laser wavelength, received power, module temperature, laser temperature, or voltage measured at a specific portion of the optical transceiver module.

15. The optical transceiver module in accordance with claim 11, the optical transceiver module further including a receive path comprising an opto-electric transducer configured to convert a received optical signal into a received electrical signal and a post-amplifier configured to process the received electrical signal, a transmit path comprising an electro-optic transducer driver configured to generate an electrical transmit signal, and an electro-optic transducer configured to convert the electrical transmit signal into an optical transmit signal, and a configurable switch array, wherein the act of performing one or more diagnostic self-tests comprises:

an act of controlling the configurable switch array to selectively connect and disconnect a node in the receive path between the opto-electric transducer and the post-amplifier with a node in the transmit path between the electro-optic transducer driver and the electro-optic transducer such that the optical transceiver module enters or leaves an analog loopback mode.

16. The optical transceiver module in accordance with claim 15, wherein the configurable switch array comprises:

a first switch for connecting the electro-optic transducer driver to the post-amplifier;

a second switch for connecting the opto-electric transducer to the electro-optic transducer;

a third switch for connecting the electro-optic transducer driver to the electro-optic transducer; and a fourth switch for connecting the post-amplifier to the opto-electric transducer.

17. The optical transceiver module in accordance with claim 11, the optical transceiver module further including a microcontroller that includes the at least one processor and the system memory, the microprocessor further including a plurality of input terminals, a plurality of output terminals, and a configurable switch array, wherein the act of performing one or more diagnostic self-tests comprises:

an act of closing the configurable switch array so as to couple one of the output terminals to one of the input terminals;

an act of asserting a signal on the output terminal;

an act of receiving a corresponding signal on the input terminal; and an act of detecting a response of the microcontroller to the received signal on the input terminal.

18. In an optical transceiver module that includes at least one processor, a persistent memory and a system memory, a method for the optical transceiver module to perform one or more diagnostic self-tests without the assistance of a host operating system, the method comprising the following:

an act of loading microcode from the persistent memory to the system memory;

an act of executing the microcode using the at least one processor, wherein the microcode is structured such that the optical transceiver module performs the following when executed by the at least one processor:
   an act of performing one or more diagnostic self-tests;
   an act of storing diagnostic result data of the one or more diagnostic self-tests the in the persistent memory; and
   an act of formatting the stored diagnostic results for analysis, wherein the act of formatting the stored diagnostic results for analysis includes creating a record that indicates if the result data matches expected results for a given change in a specific environmental parameter, wherein the optical transceiver module is configured to be connected to a test board and placed in an environmental chamber during performance of the one or more diagnostic self-tests.

19. In an optical transceiver module that includes at least one processor, a persistent memory and a system memory, a method for the optical transceiver module to perform one or more diagnostic self-tests without the assistance of a host operating system, the method comprising the following:

an act of loading microcode from the persistent memory to the system memory;

an act of executing the microcode using the at least one processor, wherein the microcode is structured such that the optical transceiver module performs the following when executed by the at least one processor:

an act of performing one or more diagnostic self-tests;

an act of storing diagnostic result data of the one or more diagnostic self-tests the in the persistent memory; and an act of formatting the stored diagnostic results for analysis, wherein the act of formatting the stored diagnostic results for analysis includes creating a status marker that indicates if the result data matches expected results for a given change in a specific environmental parameter, wherein the optical transceiver module is configured to be connected to a test board and placed in an environmental chamber during performance of the one or more diagnostic self-tests.

* * * * *

UNITED STATES PATENT AND TRADEMARK OFFICE
CERTIFICATE OF CORRECTION

PATENT NO.        : 8,583,395 B2
APPLICATION NO.   : 11/781407
DATED             : November 12, 2013
INVENTOR(S)       : Dybsetter et al.

It is certified that error appears in the above-identified patent and that said Letters Patent is hereby corrected as shown below:

In the Drawings

Figure 6:
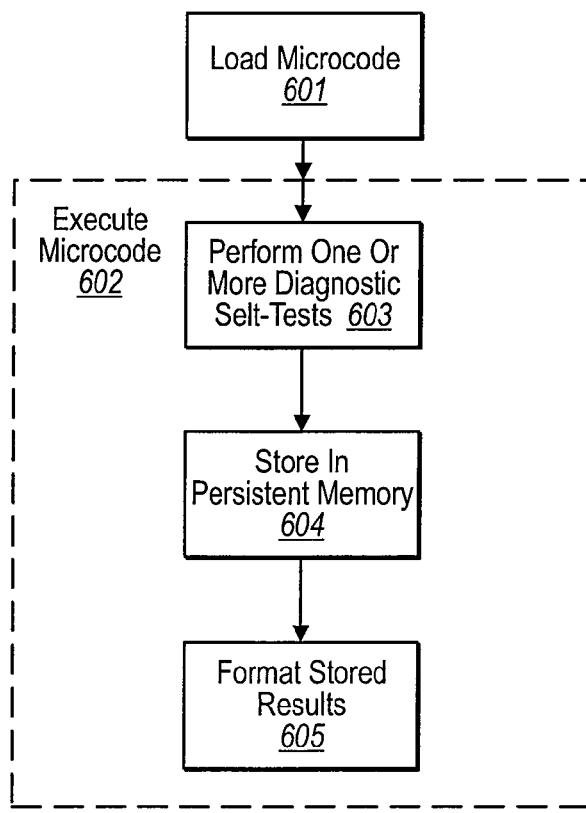
FIG. 6 illustrates a method for performing one or more diagnostic self-tests in accordance with one embodiment of the present invention.

In Fig. 6, Sheet 5 of 6, in Box "603", in Line 3, delete "Selt-Tests" and insert -- Self-Tests --, therefor.

In the Claims

In Column 15, Line 27, in Claim 11, delete "the in the" and insert -- in the --, therefor.

In Column 16, Line 50, in Claim 18, delete "the in the" and insert -- in the --, therefor.

In Column 17, Line 7, in Claim 19, delete "the in the" and insert -- in the --, therefor.

Signed and Sealed this
Eleventh Day of March, 2014

Michelle K. Lee
*Deputy Director of the United States Patent and Trademark Office*